United States Patent [19]

Larsen

[11] 4,453,282

[45] Jun. 12, 1984

[54] DOCK LEVELLER RELEASABLE FROM DOCK INSTALLATION

[75] Inventor: Kurt K. Larsen, Pell City, Ala.

[73] Assignee: Blue Giant Equipment of Canada Ltd., Brampton, Canada

[21] Appl. No.: 387,514

[22] Filed: Jun. 11, 1982

[51] Int. Cl.³ .............................................. E01D 1/00
[52] U.S. Cl. .................................................... 14/71.1
[58] Field of Search .................. 14/71.1, 71.3, 71.7, 14/72.5, 69.5, 36, 37, 38; 16/263, 262

[56] References Cited

U.S. PATENT DOCUMENTS

| 3,204,270 | 9/1965 | Fenton | 14/71.7 |
| 3,334,368 | 8/1967 | McIntosh et al. | 14/71.3 |
| 3,335,442 | 8/1967 | Kumpolt | 14/71.3 |
| 3,345,665 | 10/1967 | Anderson, Jr. | 14/71.7 |
| 3,805,325 | 4/1974 | Lee | 16/262 |
| 3,952,528 | 4/1976 | Donkersloot | 14/71.1 X |
| 4,347,638 | 9/1982 | Weaver | 14/71.1 |

Primary Examiner—Ernest R. Purser
Assistant Examiner—Beverly E. Hjorth

[57] ABSTRACT

A dock leveller for releasable securement to a loading dock installation is disclosed. The dock leveller comprises a main frame with a ramp hinged to the main frame for swinging movement. Securement devices are provided for releasably securing the dock leveller to the dock installation. The securement devices comprise at least one latch for connecting the main frame to the dock installation. The arrangement of latches is such to fix securely the dock leveller to the dock for withstanding traffic over the ramp.

6 Claims, 6 Drawing Figures

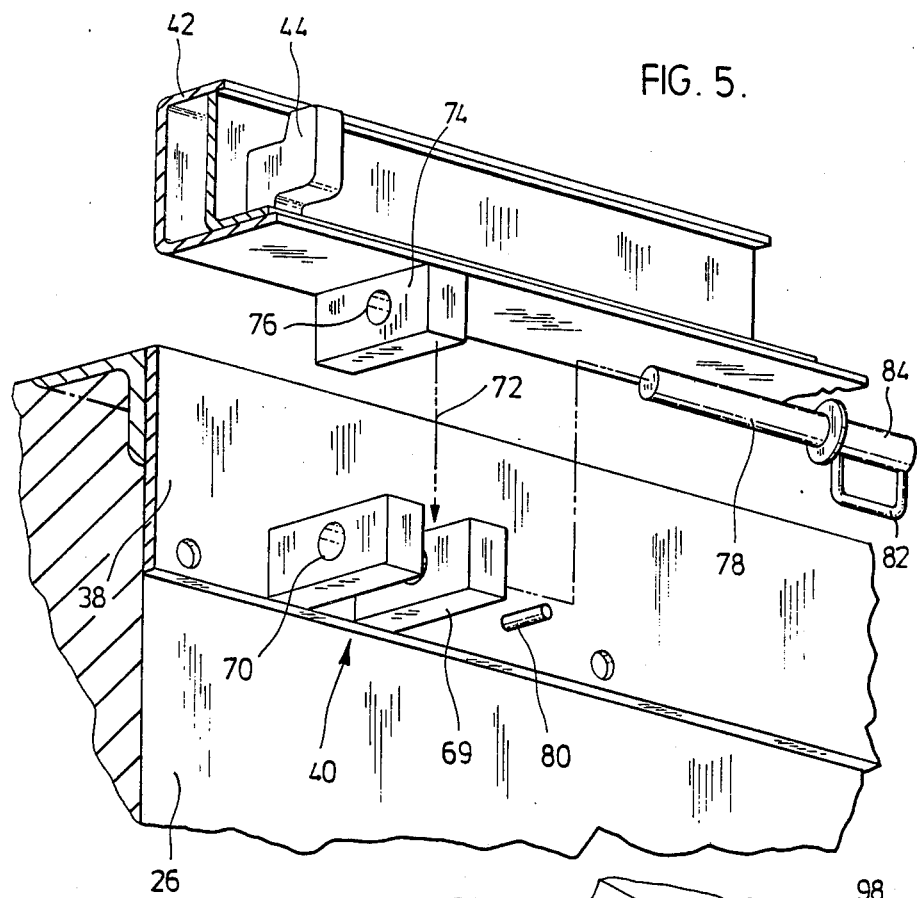
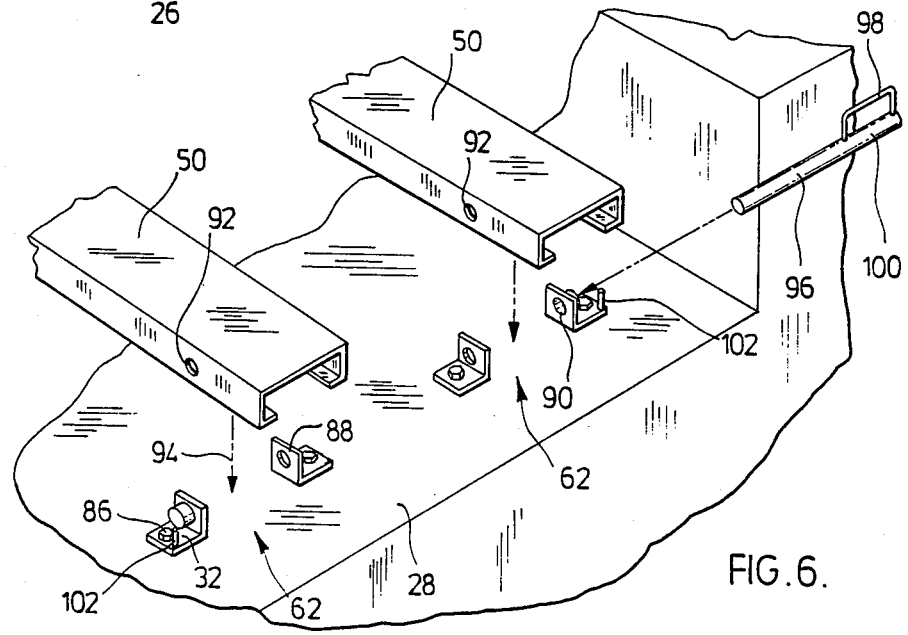

DOCK LEVELLER RELEASABLE FROM DOCK INSTALLATION

FIELD OF THE INVENTION

This invention relates to dock levellers and more particularly to those adapted for ready removal from a loading dock installation.

BACKGROUND OF THE INVENTION

The common approach for installing dock levellers in pits of loading dock installations is to weld, or in some other manner permanently secure the dock leveller in the pit. U.S. Pat. No. 3,316,575 to Larsen et al discloses a type of mechanical dock leveller. The dock leveller includes a frame to which a ramp is hinged for swinging movement. Extension springs in combination with a lever arm are used to raise the dock for purposes of lowering it onto a truck bed to bridge the gap between the dock installation and the level of a truck bed.

Mechanical dock levellers are only one type. Another type is that commonly referred to as a hydraulic dock leveller. A typical unit is disclosed in Canadian Pat. No. 935,606 to Larsen et al. The hydraulic dock leveller also comprises a frame to which a ramp is hinged. Instead of extension springs and mechanical linkage, the ramp is raised and lowered by use of a controlled hydraulic cylinder arrangement. In each instance, the frame portion to which the ramp is hinged is secured in the pit by welding the frame to steel components, which may be embedded in the concrete. Commonly, the rear portion of the frame is welded to a steel beam which is embedded in the end wall of the concrete pit. The forward portion of the leveller frame is welded to steel components which are also embedded in the pit concrete bottom. In some installations where the steel components have not been embedded in the concrete, they are set in the concrete by the use of lag bolts or the like. Lag bolts tend to corrode and eventually become permanently fixed in the concrete due to the corrosion and thus are not readily removable from the concrete.

Other forms of mechanical dock levellers are disclosed in Kumpolt, Canadian Pat. No. 766,440 and in U.S. Pat. No. 3,137,876 to Loomis Machine Co. In both of these patents, the dock levellers are permanently secured in the concrete of the dock loading installation.

Kelley Company Inc. discloses in its U.S. Pat. No. 4,014,059 an arrangement having levelling feet which are welded in position as they engage the pit bottom. Once the dock is levelled, it is welded to a plate embedded in the concrete at the rear of the pit to permanently secure the dock leveller.

Ambli discloses in U.S. Pat. No. 3,122,764 a mini-dock leveller which is bolted to the loading dock installation. This suffers the same problems as with the use of lag bolts. They corrode and usually require the use of a torch or the like to cut the bolts so that the dock platform can be removed for service, replacement or cleaning.

To provide for flexibility in the use of a dock leveller, Kumpolt, U.S. Pat. No. 3,639,935, discloses a portable dock leveller which is mounted on wheels and may be transported from area to area for use in bridging different heights. A similar approach in providing for a portable platform is disclosed by Miles in U.S. Pat. No. 3,261,489. The unit may be readily picked up by the use of a fork lift truck and put in position to provide for traffic movement from one level to another.

As to the aspect of providing for removability of platforms and ramps, couplers are disclosed in U.S. Pat Nos. 3,296,639 and 3,735,440. These coupling arrangements are particularly adapted for use with ship installations.

The dock leveller, as embodied in this invention, provides for releasably securing the dock leveller to the dock to permit ready removal of the dock leveller for repair, replacement and/or cleaning.

SUMMARY OF THE INVENTION

In a loading dock installation, a removable dock leveller is releasably secured to the dock installation. The dock leveller comprises a main frame with a ramp hinged to the frame for swinging movement. Means is provided for releasably securing the dock leveller to the dock installation. The securing means comprises a plurality of latches for connecting the main frame to the concrete of the dock installation. The arrangement of the latches is such to fix securely the dock leveller for withstanding traffic over the ramp.

With larger dock leveller installations, they are normally installed in an open-ended pit in a loading dock. The pit has parallel sidewalls, a rear end wall and a bottom. The dock leveller comprises a main frame having a rear support frame adjacent the pit end wall and a front frame adjacent the front of the pit bottom. The ramp is hinged to the rear frame for swinging movement. Means is provided for releasably securing the dock leveller in the pit. The securement means comprises at least one latch for connecting the rear frame to the upper portion of the pit end wall and at least one latch for connecting the front frame to the pit bottom. The arrangement of the latches is such to fix securely the dock leveller in the pit for withstanding traffic over the ramp.

The latches are readily accessible with the ramp in the raised position, so that they may be released to permit removal of the dock leveller from the pit. The front frame of the dock leveller may be adapted to readily receive forks of a fork lift truck, so that the dock leveller can be removed for replacement, repair and/or clean out of the pit area.

Each of the latches comprises a latch component secured to the frame and a cooperating latch component fixed to the dock concrete. The latch components may be fixed to the concrete in many ways, such as to steel embedded in the concrete. A slide bolt is provided for interconnecting the latch components by insertion through aligned bores in or sleeves or tubes of the latch components. Several latches may be provided on the front and rear frames depending upon the loads to be carried by the dock leveller, the forces applied thereto and the extent of traffic over the dock leveller.

BRIEF DESCRIPTION OF THE DRAWINGS

Preferred embodiments of the invention are shown in the drawings, wherein:

FIG. 5 shows the mounting of the rear frame portion by the use of latches to the pit end wall; and FIG. 6 shows the latching of the front frame portion of the dock leveller to the pit bottom.

DETAILED DESCRIPTION OF THE PREFERRED EMBODIMENTS

Dock levellers are used in many situations to bridge the difference in levels between a loading dock and the flat bed of a truck. The operation of such dock levellers, whether they be mechanical or hydraulic, are well understood. A ramp, as hinged to a frame secured to the dock, is hinged upwardly by the mechanical or hydraulic power device, the truck is backed in against the dock and the ramp is lowered. A lip pivoted to the ramp rests on the bed of the truck to allow fork lift vehicles and the like to travel from the dock onto the truck bed. Quite often heavy loads are transported over the ramp, so that the dock leveller has to be of substantial construction. In addition, it is important to locate fixedly the dock leveller to the loading dock installation. Thus, as explained, it has been the practice to permanently fix the dock leveller in the pit by welding techniques. However, such permanent installation does not facilitate replacement, repair and/or clean out of the dock leveller and pit area.

Figure 1:
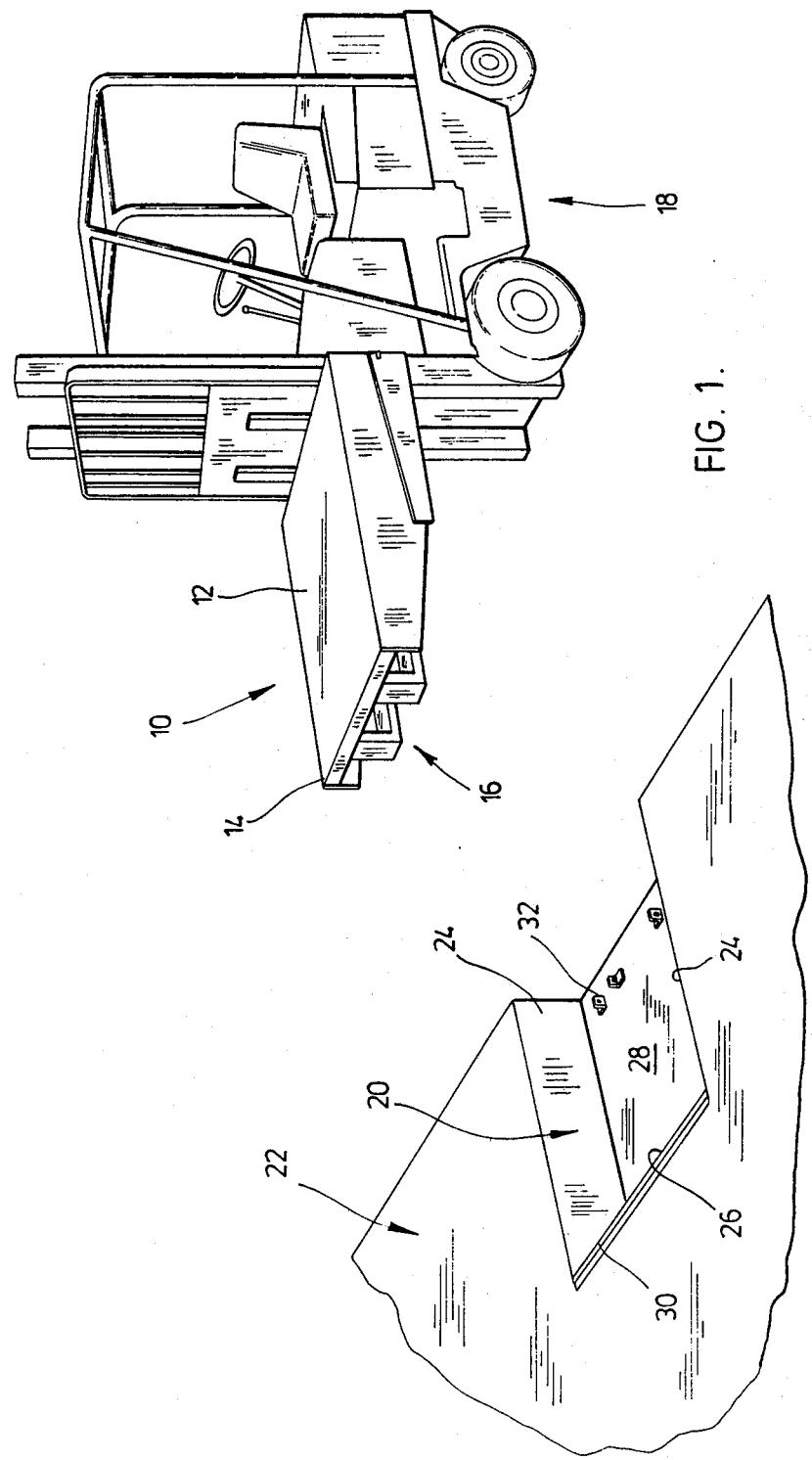
FIG. 1 is a perspective view showing a dock leveller as embodied by the invention for installation in an open-ended pit of a loading dock.

The dock leveller may be either attached to the edge of a dock for bridging difference in height between the dock and the truck bed, or substantially larger dock levellers may be installed in a pit of the loading dock installation to bridge the gap between the trunk bed and dock and, due to its size, handle significantly heavier loads. With reference to describing a preferred embodiment of the invention, the dock leveller to be discussed is of the larger type which is releasably secured in the pit of a dock installation. The dock leveller 10, as shown in FIG. 1 of the drawings, has a ramp portion 12 hingedly secured at 14 to the frame 16. A fork lift truck 18 has its forks inserted in the frame 16 to transport the dock leveller for installation in the pit 20 of a loading dock installation 22. The pit 20 is open ended and consists of parallel sidewalls 24, an end wall 26 and a bottom 28. The height of the frame 16 is such that, when the dock leveller is located in the pit 20, the ramp 12 is essentially flush with the surface of the loading dock 22. Secured to the end wall 26 of the pit is a component 30 of the device for releasably securing the dock leveller 10 in the pit. Component 30 connects with the rear portion of the frame 16. Secured in the bottom 28 of the pit are additional components 32 which are releasably secured to the front portion of the frame of the dock leveller 10.

Figure 2:
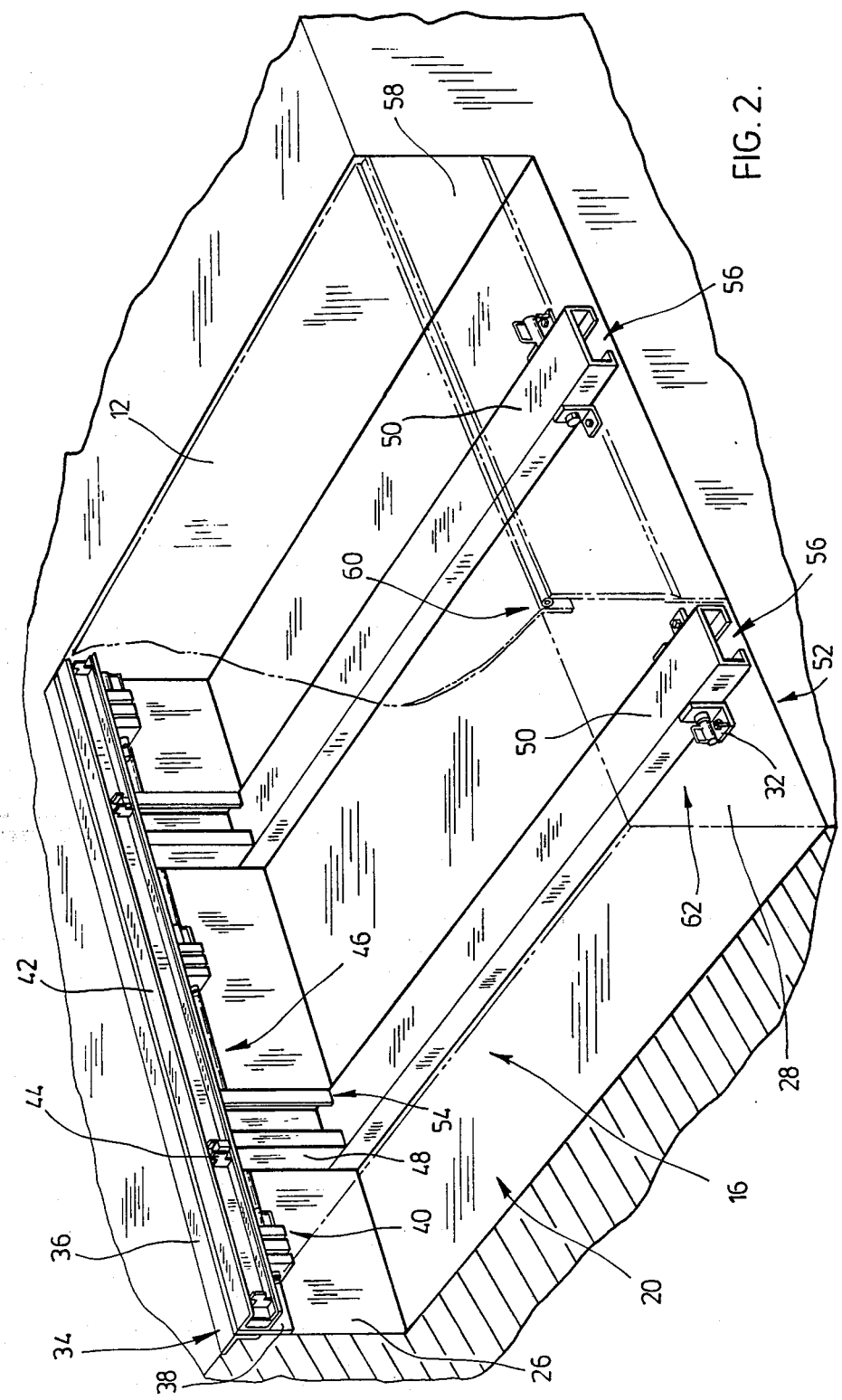
FIG. 2 is a perspective view of the dock leveller of FIG. 1 installed in the pit with portions of the dock leveller cut away to show the installation.

Turning to FIG. 2, further details of the device for releasably securing the dock leveller in the pit are shown. The end wall 26 of the pit 20 has embedded in the concrete thereof a plate arrangement 34 which consists of an angle iron 36 having an upright plate portion 38 welded thereto. A component of the latch 40 is secured to the plate 38. The other component of the latch 40 is secured to a beam in the form of a channel 42 which carries the hinge brackets 44 to which the ramp 12 is hingedly connected. The frame 16 of the dock leveller, therefore, consists of a rear frame portion generally designated 46 which consists of, according to this embodiment, the channel 42 and vertical supports 48 for supporting the channel 42.

The frame portion 16 also includes a front frame comprising two spaced-apart members 50 which extend rearwardly of the pit front at 52. With mechanical and hydraulic dock levellers, the front frame portion supports components used in swinging the ramp. With the mechanical type dock leveller, as disclosed in U.S. Pat. No. 3,316,575 to Larsen et al, the cam portion on which the lever arm rides to raise the dock is secured to the front frame portion. Similarly with hydraulic type dock levellers a portion of the hydraulic cylinder arrangement may be connected to the front frame portion.

According to this embodiment, members 50 are interconnected to the rear frame portion at 54 to the vertical supports 48. The front frame members 50 have open ends 56 which receive the forks of a fork lift truck. The dock leveller may be lifted and transported in the manner schematically shown in FIG. 1. As shown in dot, the relative location of the ramp 12 is indicated and the lip 58 is attached to the forward portion of the ramp 12 by hinge 60. The operation of the lip in conjunction with the ramp is well understood as disclosed in the afore-mentioned patents.

The front frame members 50 are releasably secured to the pit bottom 28 by the latches 62. There are components on the frame which cooperate with the units 32 permanently secured to the concrete.

Figure 3:
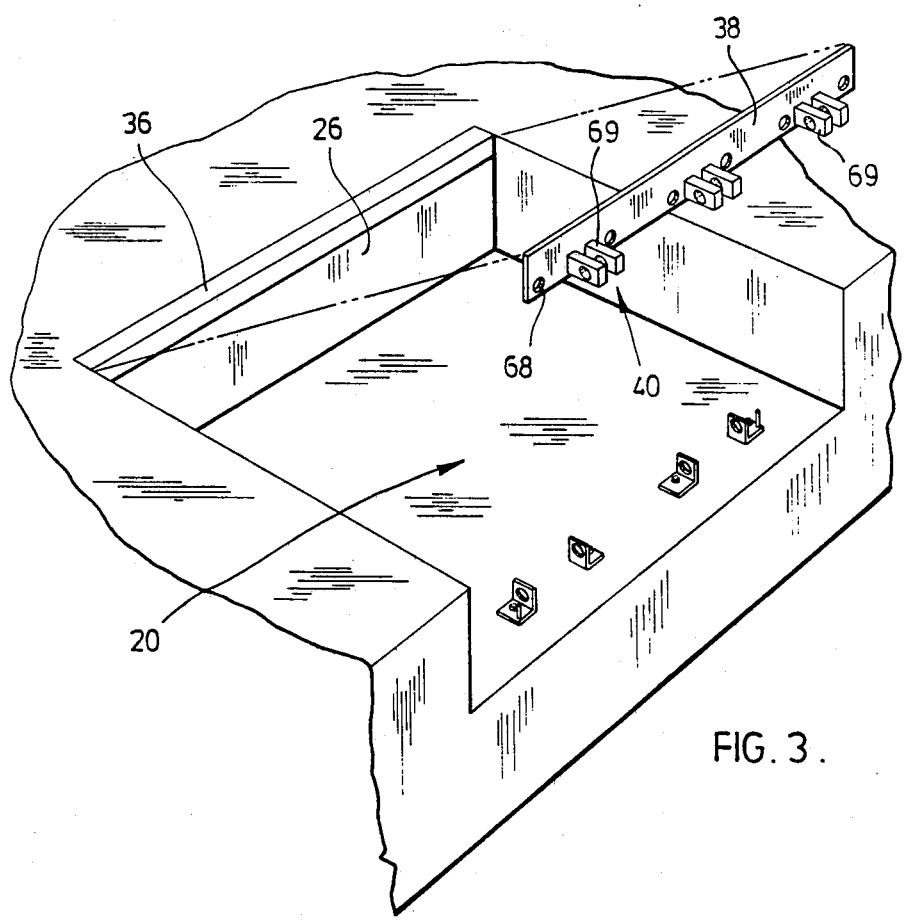
FIG. 3 shows the securement of latching components in the dock pit.
Figure 4:
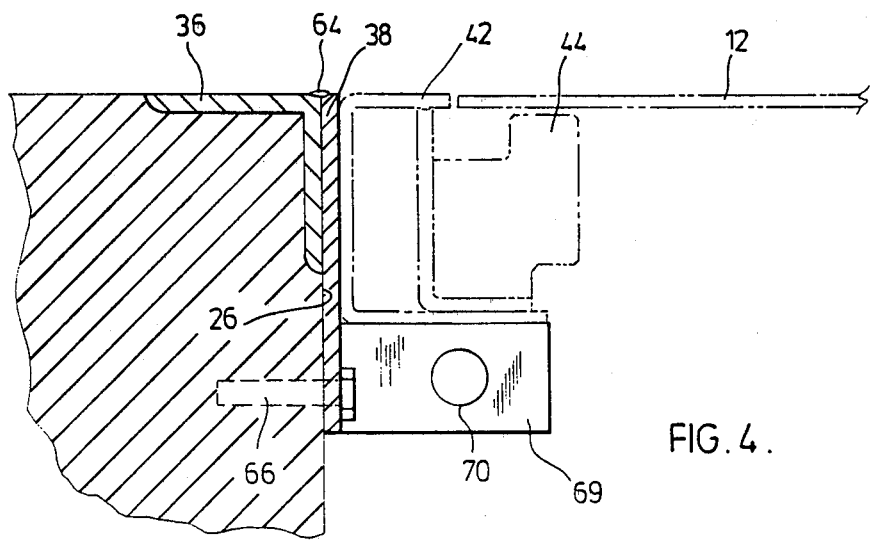
FIG. 4 shows in section the rear frame latched to the latch component secured to the pit end wall.

FIG. 3 shows in more detail the location of the components for securing the dock leveller in the pit 20. The angle iron 36 is embedded in the concrete of the end wall 26 where the vertical plate 38 is welded and/or lag screwed to the concrete of the pit end wall 26. In addition, plate 38 may be directly embedded in the concrete. The actual attachment is shown in more detail in FIG. 4, where the angle iron has the vertical plate 38 welded to its upper portion by weld 64. At the base of the vertical plate, lag bolts 66 extend through apertures 68 in the plate 38 shown in FIG. 3, to permanently fix the plate 38 to the end wall 26 of the pit. As shown in FIG. 3, components of the latches 40 are secured to the plate 38, namely parallel lugs 69 which cooperate with corresponding lugs or tubes or sleeves on the U-shaped channel 42. The lugs have aligned apertures 70, as shown in FIG. 4, through which a slide bolt is positioned to provide for releasable securement of the rear frame portion of the dock leveller to the pit.

Turning to FIG. 5, with the dock leveller supported by the fork lift truck and with the ramp in the raised position, an operator may readily enter underneath the dock leveller to latch the frame in the pit. The dock leveller, as lowered in the direction of arrow 72, has the lug 74 with its aperture 76 aligned with the apertures 70 of the lugs 69 secured to the plate 38. A slide bolt 78 is inserted through the aligned apertures. A pin arrangemet 80 is provided which extends through the loop 82 of the slide bolt handle 84 to prevent accidental removal of the slide bolt from the interconnected lugs of the latch arrangement 40. As shown in FIG. 2, three latches are provided along the rear frame portion.

In a similar manner, the front frame members 50 are releasably secured to the front portion of the pit bottom 28. Components 32 are permanently secured to the pit bottom 28 which may be accomplished by welding them to units fixed in the concrete or permanently embedding them in the concrete or, as shown in FIG. 6, they may be permanently secured by the use of lag bolts 86. The components of the latch 62 consist of upstanding lugs or angles 88 having apertures 90 therein. On the front frame members 50, latch components in the form of bores 92 are provided which, when lowered into components 32 in the direction of arrow 94, become aligned with apertures 90. A slide bolt 96 with a loop 98 on its handle 100 is inserted through the aligned apertures for each front frame member 50 to releasably secure them in the pit. Again pin portion 102 is provided on each component 32 which extends through the loops 98 to prevent accidental removal of the bolts from the latches 62.

The apparatus, according to this invention for releasably installing a dock leveller in a pit, is more reliable in that oftentimes it is difficult for a welder to weld the frame in the pit. Thus with the use of latches, a secure installation is assured. The replacable aspect provides for easy replacement of the dock leveller, not only for damages, but to allow upgrading to heavier models if there is a change in the traffic. The units are especially usable for loading docks of food chains, brewery and liquor industries where clean out of the pit areas is necessary in accordance with health and safety regulations.

The arrangement of the latches is such that the dock leveller is fixedly secured in the pit. The latches, which secure the rear frame portion of the dock leveller to the end wall of the pit, ensure that the ramp portion does not pull away from the pit with traffic thereover. In locating the latches on the front frame members, this ensures that the frame does not move forwardly of the pit during traffic over the ramp. Also, this prevents the dock leveller from bouncing up when the ramp is raised for subsequent lowering onto a truck bed.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. A dock leveller assembly for securement in an open ended pit having parallel sidewalls, a rear end wall and bottom, said assembly comprising a dock leveller, separate rear securement means in fixed engagement with the upper portion of the pit endwall and extending into said open pit and releasably securable to said dock leveller, and separate front securement means in fixed engagement with said pit bottom and extending into said open pit and releasably securable to said dock leveller, said dock leveller comprising an integrated frame having a front frame portion and a rear frame portion and a ramp including a hinge securing said ramp to said rear frame for swinging movement, said front frame portion for supporting components for swinging the ramp about said hinge, said front frame portion and said front securement means cooperating to removably receive at least one securing member therebetween at a position spaced from said pit bottom, said rear frame portion cooperating with said separate rear securement means to removably receive at least one securing member therebetween at a position spaced from said pit endwall, said securing members when received by said frame portions and said separate securing means fixing said dock leveller in said pit and permitting removal of said dock leveller from said pit by removing said securing members.

2. A dock leveller assembly as claimed in claim 1, wherein each of said securing members in a sliding bolt and said frame portions and said separate securing means including aligned bores therein for receiving said sliding bolt.

3. A dock leveller assembly as claimed in claim 2, wherein each of said sliding bolts includes a projecting portion on one side thereof which is engagable with said separate securement means to retain said bolt received in said frame portion and said separate securement means.

4. A dock leveller assembly as claimed in claim 3, wherein said projecting portion on one side of said bolt forms a handle which cooperates with a pin member on said separate securement means to retain said bolt.

5. A dock leveller assembly as claimed in claim 1, wherein said rear frame portion includes a pair of vertical uprights interconnected at the upper edge thereof by a beam to which said ramp is hinged, said beam including at least two lug portions extending downwardly from the lower surface of said beam, said separate rear securement means including a plate with outwardly extending lugs adjacent said lugs of said beam, said lugs including axially aligned bores for receiving one of said securing members, each of which is sliding bolt.

6. A dock leveller assembly as claimed in claim 1, 2 or 5, wherein said front frame portion includes two channels adapted to receive the forks of a lift truck for purposes of insertion and removal of said dock leveller into and from said pit.

* * * * *